G. W. COPELAND.
HARROW.
APPLICATION FILED NOV. 8, 1911.
1,020,189. Patented Mar. 12, 1912.
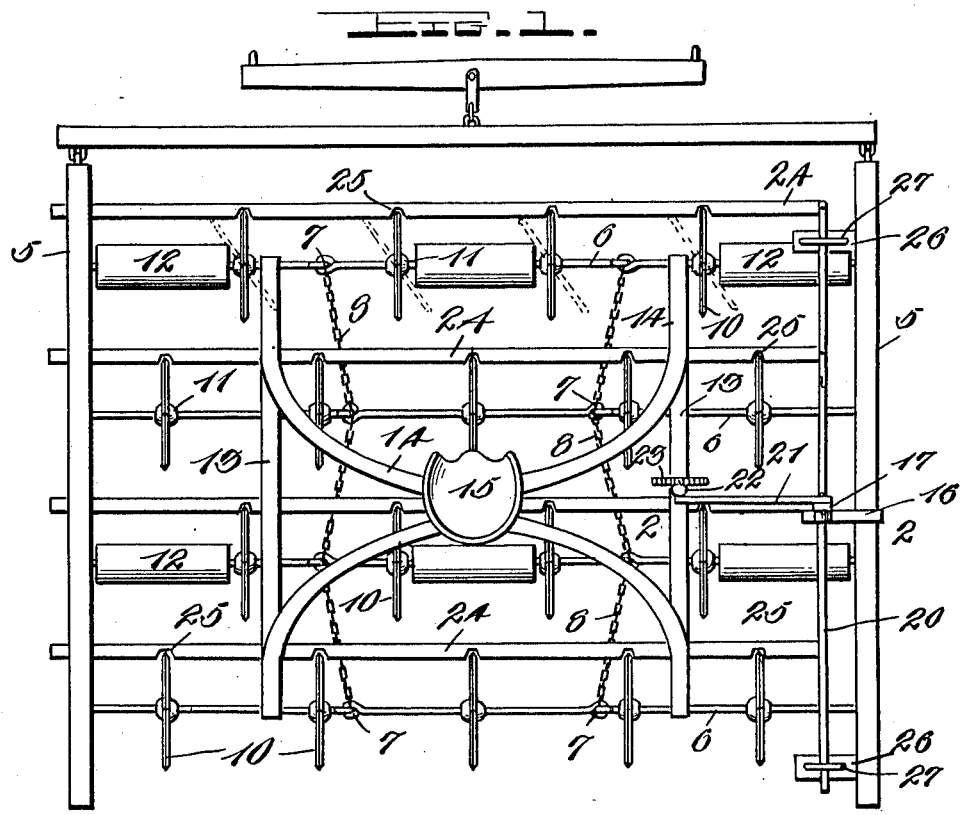
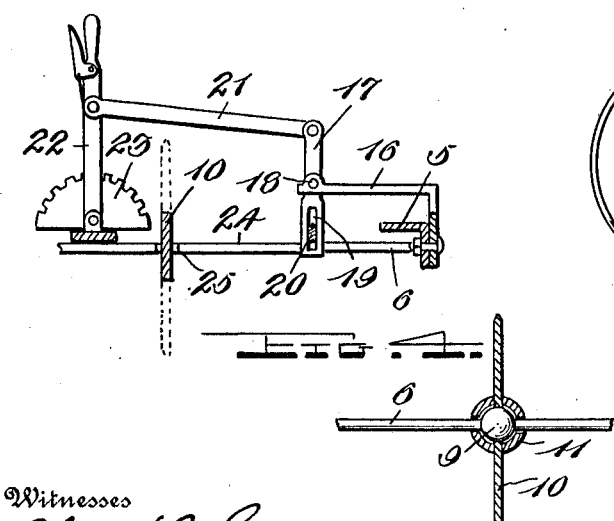
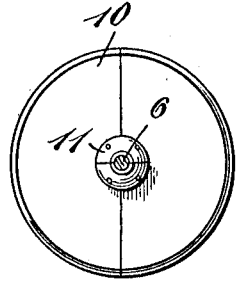
Witnesses
Chas. L. Griestauer.
L. G. Ellis.
Inventor
G. W. Copeland,
By Watson E. Coleman
Attorney

UNITED STATES PATENT OFFICE.

GEORGE W. COPELAND, OF ENSLEY, ALABAMA, ASSIGNOR OF ONE-HALF TO JAMES W. KARR, OF ENSLEY, ALABAMA.

HARROW.

1,020,189.  Specification of Letters Patent.  Patented Mar. 12, 1912.

Application filed November 8, 1911. Serial No. 659,129.

*To all whom it may concern:*

Be it known that I, GEORGE W. COPELAND, a citizen of the United States, residing at Ensley, in the county of Jefferson and State of Alabama, have invented certain new and useful Improvements in Harrows, of which the following is a specification, reference being had to the accompanying drawings.

This invention relates to harrows and has for its object to provide a disk harrow of simple and novel construction including means whereby the disks may be angularly positioned when the harrow is turned upon reaching the end of the field.

A further object of the invention is to provide improved means for mounting the disks in the frame of the harrow for free rotative movement and bodily movement to angularly position the same with relation to the longitudinal axis of the harrow, and a plurality of transversely movable bars having notches to receive the edges of the disks and retain the disks in parallel relation to the line of movement of the harrow.

A further object of the invention is to provide a disk harrow and disk adjusting means therefor whereby the harrow may be easily turned without danger of breaking the disks or the shafts on which they are mounted, thereby materially increasing the durability and efficiency of the harrow.

With the above and other objects in view, the invention consists of the novel features of construction, combination and arrangement of parts hereinafter fully described and claimed, and illustrated in the accompanying drawings, in which—

Figure 1 is a plan view of a disk harrow embodying my improvements; Fig. 2 is an enlarged section taken on the line 2—2 of Fig. 1; Fig. 3 is a side elevation of one of the disks; Fig. 4 is an enlarged detail section of the disk mounting.

Referring in detail to the drawing 5 designates the longitudinal side bars of the harrow which are preferably formed of angle iron and have their horizontal flanges extending inwardly. To the vertical flanges of these angle bars the ends of the disk carrying rods 6 are loosely connected. These rods are each formed in a plurality of sections loosely jointed together as indicated at 7. The series of transverse disk carrying rods are connected at the joints 7 by means of the short chains 8. Upon these transversely disposed rod sections, the harrow disks are mounted in the following manner: The rod sections are provided with the spaced spherical enlargements 9. The harrow disks 10 are preferably formed in two sections each of which carries one-half of a socket casing 11, said socket casings being arranged upon each face of the disk. These casings project from the opposite faces of the disks to a sufficient extent to prevent their longitudinal movement upon the supporting rod sections. Between certain of the disks on the supporting rod sections, clod crushing rollers 12 are loosely mounted. These rollers, however, are not essential elements of the construction and may be eliminated if desired. Longitudinal frame bars 13 have their ends bent around the front and rear transverse rods 6 and to the same the seat supporting bars 14 are removably secured in any desired manner. These seat supporting bars converge inwardly and upwardly and the seat 15 is fixed to the upper ends thereof and is disposed over the approximate center of the machine.

By providing the ball and socket mounting for the disks upon the rods 6, their free rotative movement is permitted as the machine travels over the ground and they are also capable of transverse angular movement with relation to the longitudinal plane of the harrow when the machine is turned at the end of the field. I provide manually operable means for effecting this angular disposition of the disks, said mechanism being constructed and mounted in the following manner. To one of the angular side bars 5 of the frame, a plurality of inwardly extending bracket plates 16 are bolted or otherwise rigidly secured and upon the horizontal flange of the central bracket, the vertically disposed arm 17 is fulcrumed intermediate of its ends as indicated at 18. The lower end of this arm is provided with a longitudinal slot 19 through which the sections of a longitudinally disposed bar 20 are disposed. These bar sections are pivotally connected for relative vertical movement and are disposed directly over the transverse disk carrying rods 6 which are adapted to engage with the bar 20 and lift the sections thereof when the disks pass over a broken or uneven surface. Thus undue strain upon the bar 20 and liability of breakage thereof is obviated. The central section of the bar 20 is freely movable in the slot 19 in the lower end of the arm 17 for a similar purpose. A rod 21 connects the upper end of the arm 17 to a lever 22 which is pivotally mounted at its lower end upon one face of a rack 23 and carries the usual spring actuated dog for engagement with the teeth of said rack to lock the lever in its adjusted position. To the sections of the bar 20 a plurality of transverse bars 24 are rigidly secured at one of their ends, the other ends of said bars being movably disposed through openings provided in the longitudinal bar 5 of the harrow frame on the opposite side thereof. These transverse bars 24 are provided with a plurality of notches or recesses 25 which receive the edge portions of the disks 10. By this arrangement of parts it will be seen that when the operator grasps the upper end of the lever 22 and forces the same outwardly toward the side of the machine the lower end of arm 17 is thrown inwardly, thereby shifting the longitudinal bar 20 thereof and also moving the bars 24 transversely so that the disks are disposed at an angle as illustrated in dotted lines in Fig. 1 to facilitate the turning of the machine to the left. When it is desired to turn to the right it is of course understood that the lever 22 is pulled in the opposite direction. The end sections of the bar 20 are supported in suitable guides 26 which are rigidly fixed to the ends of the longitudinal frame bar 5, said guides including the loops 27 which permit of the limited vertical and transverse movement of the rod sections. To the front ends of the longitudinal frame bars the usual draft attachments may be connected in any approved manner.

From the foregoing it is believed that the construction and operation of my improved rotary disk harrow will be fully understood. The means provided for positioning the disks in the turning of the machine is extremely simple and effective and does not interfere in any way with the continued rotation of the disks. The jointed construction of the disk carrying rods and the bar 20 permits of the relative movement of the various sections so that the disks of each series may be disposed at different elevations. It is of course understood that the openings in the frame bar 5 through which the ends of the transverse bars 24 move are sufficiently large to permit of the vertical movement of said bar with the disk. The various parts employed in my improved construction are all of simple form and may be readily manufactured and assembled at small cost.

While I have shown and described the preferred construction and arrangement of the various elements, it will be obvious that the same are susceptible of considerable modification without departing from the essential feature or sacrificing any of the advantages of the invention.

Having thus described the invention what is claimed is:—

1. In a disk harrow, a plurality of disk carrying rods each consisting of a plurality of jointed sections, a series of disks rotatably mounted on each of the rods and also bodily movable thereon to angular positions with relation to the longitudinal axis of the machine, and means for simultaneously moving all of the disks to such angular positions.

2. In a disk harrow, a plurality of transversely disposed disk carrying rods each consisting of a plurality of jointed sections, chains connecting adjacent rods at the joints of said sections, a plurality of disks rotatably mounted upon each of the rods and capable of bodily movement to angular positions with relation to the longitudinal axis of the harrow, a plurality of transversely movable bars coacting with the disks to normally prevent their angular movement, and manually operable means for simultaneously moving said transverse bars to angularly position the disks.

3. In a disk harrow, a plurality of transversely disposed spaced disk carrying rods, a series of disks rotatably mounted upon each of the rods and movable thereon to angular positions with relation to the longitudinal axis of the harrow, a longitudinally movable bar for each series of disks having notches in its ends to receive the edge portions of the disks, said bars normally preventing the angular movement of the disks, and manually operable means connected to said bars to simultaneously move the same and shift the disks to their angular positions.

4. In a disk harrow, a plurality of transversely disposed disk carrying rods, a series of disks rotatably mounted upon each of the rods and angularly movable thereon, a plurality of transversely disposed movable bars associated with said disks and normally preventing their angular movement, and a longitudinally disposed transversely movable bar connected to said transverse bars to simultaneously move the same and angularly position the disks.

5. In a disk harrow, a plurality of transversely disposed disk carrying rods, a series of disks rotatably mounted upon each of the rods and bodily movable thereon to angular positions with relation to the line of movement of the harrow, a transversely movable bar associated with each series of disks and having notches therein to receive the edge portions of the disks, a longitudinally disposed transversely movable bar connected to said transverse bars to simultaneously move the same, guides for said longitudinal bar to limit its transverse movement, and manually operable means connected to said longitudinal bar to actuate the same and simultaneously shift the disks to angular positions.

6. In a disk harrow, a plurality of transversely disposed disk carrying rods each consisting of a plurality of jointed sections, a series of disks rotatably mounted upon each of the rods and having bodily transverse angular movement thereon, a transversely movable bar associated with each series of disks and normally preventing their angular movement, a longitudinally disposed transversely movable bar consisting of a plurality of jointed sections extending above the disk carrying rods, guides to limit the transverse movement of said longitudinal bar, a vertically disposed arm fulcrumed intermediate of its ends and having a longitudinal slot in its lower end to receive said latter bar, said transverse disk engaging bars being connected to said longitudinal bar, and means connected to the upper end of said arm to actuate said longitudinal bar and simultaneously move the series of disks to angular positions with relation to the line of movement of the harrow.

In testimony whereof I hereunto affix my signature in the presence of two witnesses.

GEORGE W. COPELAND.

Witnesses:
 ROSCOE E. SCOTT,
 A. F. WHITTACK.

---

Copies of this patent may be obtained for five cents each, by addressing the "Commissioner of Patents, Washington, D. C."